United States Patent [19]
Lautenschlager et al.

[11] Patent Number: 5,626,660
[45] Date of Patent: May 6, 1997

[54] OPTICALLY CLEAR AMINOSILICONE COMPOSITIONS

[75] Inventors: Hans-Jürgen Lautenschlager, Haiming; Günter Mahr, Burghausen, both of Germany

[73] Assignee: Wacker-Chemie GmbH, Munich, Germany

[21] Appl. No.: 594,044

[22] Filed: Jan. 30, 1996

[30] Foreign Application Priority Data

Feb. 23, 1995 [DE] Germany ............... 19506396.1

[51] Int. Cl.⁶ .................................. C09D 183/08
[52] U.S. Cl. .................................. 106/287.11
[58] Field of Search ........................ 106/287.11

[56] References Cited

U.S. PATENT DOCUMENTS

| | | | |
|---|---|---|---|
| 4,399,247 | 8/1983 | Ona et al. | 524/204 |
| 4,661,551 | 4/1987 | Mayer et al. | 106/287.11 |
| 5,258,451 | 11/1993 | Ohsawa et al. | 524/755 |
| 5,310,783 | 5/1994 | Bernheim et al. | 524/837 |
| 5,466,746 | 11/1995 | Geck et al. | 524/837 |

FOREIGN PATENT DOCUMENTS

| | | |
|---|---|---|
| 0536765 | 4/1993 | European Pat. Off. . |
| 4306796 | 9/1994 | Germany . |
| 2036052 | 6/1980 | United Kingdom . |

OTHER PUBLICATIONS

Eur. Polym. J., vol. 28, No. 1, pp. 37–41, (1992,) No month available "Heterofunctional Condensation of Alkoxysilanes and Silanols . . . " by Helary et al.

*Primary Examiner*—David Brunsman
*Attorney, Agent, or Firm*—Martin Connaughton

[57] ABSTRACT

The optically clear compositions comprising
- (A) an organopolysiloxane which contains at least one monovalent SiC-bonded radical with primary, secondary and/or tertiary amino groups,
- (B) 0.01 to 1 part by weight per 100 parts by weight of organopolysiloxane (A) of a group of compounds consisting of water, methanol and ethanol and
- (C) 0.05 to 20 parts by weight of a solubilizing agent per 100 parts by weight of organopolysiloxane (A), chosen from a group consisting of
    - (C1) $C_1$- to $C_{19}$-carboxylic acid $C_1$- to $C_{12}$-alkyl esters and -glycol esters,
    - (C2) $C_3$- to $C_{20}$-alkanols and $C_3$- to $C_{20}$-alkanol-$C_1$- to $C_{12}$-alkoxylates and
    - (C3) organosilicon compounds containing glycoside radicals.

8 Claims, No Drawings

OPTICALLY CLEAR AMINOSILICONE COMPOSITIONS

FIELD OF INVENTION

The present invention relates to optically clear compositions based on an organopolysiloxane containing aminoalkyl groups, water, an alkanol and a solubilizing agent and the preparation thereof.

BACKGROUND OF INVENTION

Organopolysiloxanes containing aminoalkyl groups are employed as textile treatment agents, in the cosmetics industry and as release agents.

GB-A-20 36 052 describes organopolysiloxanes containing aminoalkyl groups which are formed when a polydimethylsiloxane containing terminal silanol groups and an alkoxysilane containing aminoalkyl groups are mixed at room temperature. However, the organopolysiloxane containing aminoalkyl groups prepared in this manner is cloudy since the alkanol formed as a condensation product and, optionally, water have limited solubility in the organopolysiloxane. On storage, further alkanol and water are formed during condensation reactions which proceed slowly, the siloxane chains are lengthened and an alkanol/water phase finally separates out. Accurate metering of the organopolysiloxane containing aminoalkyl groups is possible only after separation of the phases or emulsification thereof.

The separating out of alkanol and water can be avoided if the mixture is heated during preparation, in order to complete the reaction and at the same time drive off the alkanol and water. The removal in vacuo of the methanol formed in the reaction of silanols with methoxysilane containing aminoalkyl groups is described in G. Helary and G. Sauvet, Eur. Polym. J. Volume 28, No. 1 pages 37 to 41, 1991.

SUMMARY OF INVENTION

The present invention is based on providing compositions with the least possible expenditure, compositions which are based on organopolysiloxane containing aminoalkyl groups wherein cloudiness does not occur during storage and the organopolysiloxane containing aminoalkyl groups can easily be metered.

The present invention relates to optically clear compositions comprising:

(A) an organopolysiloxane which contains at least one monovalent SiC-bonded radical with primary, secondary and/or tertiary amino groups, (B) 0.01 to 1 part by weight per 100 parts by weight of organopolysiloxane (A) of a group of compounds consisting of water, methanol and ethanol and (C) 0.05 to 20 parts by weight of a solubilizing agent per 100 parts by weight of organopolysiloxane (A), chosen from a group consisting of (C1) $C_1$- to $C_{19}$-carboxylic acid $C_1$- to $C_{12}$-alkyl esters and -glycol esters, (C2) $C_3$- to $C_{20}$-alkanols and $C_3$- to $C_{20}$-alkanol-$C_1$- to $C_{12}$-alkoxylates and (C3) organosilicon compounds containing glycoside radicals.

For most applications, the optically clear composition is processed as an aqueous emulsion. The solubilizing agents do not have a troublesome effect during the emulsification and fulfills the function of an emulsifier or an emulsifying auxiliary. A single compound can be employed as the solubilizing agent, and mixtures of different solubilizing agents can also be employed.

In general no more than 0.5 part by weight per 100 parts by weight of organopolysiloxane (A) of compounds (B) which are chosen from water, methanol and ethanol are present in the optically clear compositions.

Preferably, the organopolysiloxane (A) in the composition contains at least one siloxane unit of the formula

  (I)

and all other siloxane units have the formula

  (II)

in which $R^1$ is identical or different monovalent optionally fluorine-, chlorine- or bromine-substituted $C_1$- to $C_{18}$-hydrocarbon radicals, hydrogen atoms, $C_1$- to $C_{12}$-alkoxy or hydroxyl radicals or alkylglycol radicals, Q is a group of the formula

  (III)

in which $R^2$ is a divalent $C_1$- to $C_{18}$-hydrocarbon radical, $R^3$ is a hydrogen atom or an optionally fluorine-, chlorine- or bromine- or $C_1$- to $C_5$-alkoxy-substituted $C_1$- to $C_{18}$-hydrocarbon radical, a has the values 0, 1, or 2, b has the values 1, 2 or 3, c has the values 0, 1, 2 or 3, d has the values 0, 1, 2, 3 or 4 and m has the values 2, 3, 4, 5 or 6 and the sum of a+b is not more than 4.

The $C_3$- to $C_{12}$-alkoxy radicals $R^1$ are of such low reactivity that the $C_3$- to $C_{12}$-alkanols formed therefrom by condensation with silanol groups or hydrolysis with water can be obtained only in a very small mount. Furthermore, these alkanols dissolve readily in the organopolysiloxane (A) and are themselves solubilizing agents (C1).

Examples of $C_1$- to $C_{18}$-hydrocarbon radicals are alkyl radicals, such as the methyl, ethyl, n-propyl, iso-propyl, n-butyl, iso-butyl, tert-butyl, n-pentyl, iso-pentyl, neopentyl and tert-pentyl radical; hexyl radicals, such as the n-hexyl radical; heptyl radicals, such as the n-heptyl radical; octyl radicals, such as the n-octyl radical and the isooctyl radicals, such as the 2,2,4-trimethylpentyl radical; nonyl radicals, such as the n-nonyl radical; decyl radicals, such as the n-decyl radical; dodecyl radicals, such as n-dodecyl radical; cycloalkyl radicals, such as cyclopentyl, cyclohexyl and cycloheptyl radicals and methylcyclohexyl radicals; aryl radicals, such as the phenyl and the naphthyl radicals; alkaryl radicals, such as o-, m- and p-tolyl radicals, xylyl radicals and ethylphenyl radicals; and aralkyl radicals, such as the benzyl radical and the α- and the β-phenylethyl radical.

The above hydrocarbon radicals $R^1$ optionally contain an aliphatic double bond. Examples are alkenyl radicals, such as the vinyl, allyl, 5-hexen-1-yl, E-4-hexen-1-yl, Z-4-hexen-1-yl, 2-(3-cyclohexenyl)-ethyl and cyclododeca-4,8-dienyl radical. Preferred radicals $R^1$ with an aliphatic double bond are the vinyl, allyl and 5-hexen-1-yl radical.

Preferably, not more than 1% of the hydrocarbon radicals $R^1$ contain a double bond.

Examples of $C_1$- to $C_{18}$-hydrocarbon radicals which are substituted by fluorine, chlorine or bromine atoms are the 3,3,3-trifluoro-n-propyl radical, the 2,2,2,2',2',2'-hexafluoroisopropyl radical, the heptafluoroisopropyl radical and the o-, m- and p-chlorophenyl radical.

Examples of the divalent $C_1$ to $C_{18}$-hydrocarbon radicals $R^2$ are saturated straight- or branched-chain or cyclic alkylene radicals, such as the methylene and ethylene radical, as well as propylene, butylene, pentylene, hexylene, 2-methylpropylene, cyclohexylene and octadecylene radicals or unsaturated alkylene or arylene radicals, such as the hexenylene radical and phenylene radicals, the n-propylene radical and the 2-methylpropylene radical being more preferred.

The alkoxy radicals are the alkyl radicals described above bonded via an oxygen atom. The examples of alkyl radicals also apply in their full scope to the alkoxy radical $R^1$.

The alkylglycol radicals $R^1$ preferably have the formula $$-R^2-[O(CHR^3)_d]_nOR^4 \qquad (IV)$$

in which $R^2$, $R^3$ and d have the above meanings, n is from 1 to 100 and $R^4$ is a hydrogen atom, a radical $R^3$ or a group of the formula

$-C-R^5$, in which $R^5$ is the radical $R^3$ or $O-R^3$.

Preferably, in the above formulae (I) to (IV), $R^1$ is a methyl, phenyl, $C_1$- to $C_3$-alkoxy or hydroxyl radical or a radical of the formula (IV), $R^2$ is a divalent $C_2$- to $C_6$-hydrocarbon radical, $R^3$ is a hydrogen atom or a methyl radical, a has the values 0 or 1, b has the value 1, c has the values 2 or 3 and d has the value 1.

Linear polydimethylsiloxanes which optionally contain $C_1$- to $C_3$-alkoxy or hydroxyl end groups are more preferred. In these polymethylsiloxanes, Q is preferably an $H_2N(CH_2)_2NH(CH_2)_3$- or $H_2N(CH_2)_2NHCH_2CH(CH_3)CH_2$- group.

The ratio of siloxane units of formula (I) to siloxane units of formula (II) is preferably 1:10 to 30,000, in particular 1:20 to 300. The amine contents are preferably 0.01 to 2 mequivalents/g, in particular 0.1 to 0.7 mequivalents/g, measured as the consumption of 1N hydrochloric acid in ml/g of organopolysiloxane (A) during titration to the neutral point.

One type of organopolysiloxane (A) can be employed. However, it is also possible to employ a mixture of at least two different types of organopolysiloxane (A).

The organopolysiloxane (A) or a mixture of at least two different types of organopolysiloxane (A) preferably has an average viscosity of 20 to 100,000 mPa.s, in particular 20 to 10,000 mPa.s, at 25° C.

The composition preferably comprises 0.1 to 10 parts by weight, in particular 0.5 to 3 parts by weight, of solubilizing agent (C) per 100 parts by weight of organopolysiloxane (A).

The organopolysiloxanes are prepared from (E) compounds which are chosen from (E1) organosilanes which contain at least one monovalent SiC-bonded radical with primary, secondary and/or tertiary amino groups and at least one $C_1$- to $C_4$-alkoxy group and (E2) organopolysiloxanes which contain at least one monovalent SiC-bonded radical with primary, secondary and/or tertiary amino groups and at least one $C_1$- to $C_4$-alkoxy and/or silanol group and (F) compounds which are chosen from (F1) organosilanes which contain at least one $C_1$- to $C_4$-alkoxy group and (F2) organopolysiloxanes which contain at least one $C_1$- to $C_4$-alkoxy group and/or silanol group.

The organosilanes (E1) preferably have the formula $$Q_eR^6_fSiR^1_{(4-e-f)} \qquad (V)$$

in which $R^6$ is a $C_1$- to $C_2$-alkoxy radical, e has the values 1, 2 or 3, preferably 1, f has the values 1, 2 or 3 and with the proviso that the sum of e+f is not more than 4, and Q and $R^1$ have the above meanings.

Preferably, the organopolysiloxane (E2) contains at least one siloxane unit of above formula (I) and at least one siloxane unit of the formula $$R^1_gR^6_hHO_iSiO_{(4-g-h-i)/2} \qquad (VI)$$

and all other siloxane units have the above formula (II), wherein g has the values 0, 1 or 2, h has the values 1, 2 or 3 and i has the values 0 or 1, with the proviso that the sum of g, h and i is not more than 3, and Q, $R^1$ and $R^6$ have the above meanings.

The organosilanes (F1) preferably have the formula $$R^6_jSiR^1_{(4-j)} \qquad (VII)$$

in which j has the values 1, 2, 3 or 4 and $R^1$ and $R^6$ have the above meanings.

Preferably, the organopolysiloxanes (F2) contain at least one siloxane unit of above formula (VI) and all other siloxane units have the above formula (II).

The organopolysiloxanes (E2) and (F2) preferably have an average viscosity of 10 to 100,000 mPa.s, preferably 20 to 10,000 mPa.s, in particular 50 to 1000 mPa.s, at 25° C.

The organopolysiloxanes (A) are preferably prepared at 0° C. to 50° C., in particular at 10° C. to 30° C.

The reaction time in which 99 mole % of the starting compound (E) and (F) have reacted to give organopolysiloxanes (A) is usually 1 hour to 20 days, in particular 12 hours to 3 days.

Preferably, 0.1 to 10 parts by weight, in particular 0.5 to 3 parts by weight, of solubilizing agent (C) are added per 100 parts by weight of starting compounds (E) and (F).

The optically clear compositions are preferably prepared by reacting the starting compounds (E) and (F) in the presence of (C) 0.01 to 20 parts by weight of the solubilizing agent described above per 100 parts by weight of starting compounds (E) and (F).

In this embodiment, the starting compounds (E) and (F) can be mixed with the solubilizing agent (C) and the optically clear compositions then form during storage and transportation. It is possible for the reaction mixture of the starting compounds (E) and (F) with the solubilizing agent (C) to be introduced directly into vessels, such as canisters, drums or tanks. After the required reaction time at the required reaction temperature, the optically clear compositions which have formed can be further processed. The required reaction time can be met on the transportation route or during warehousing.

Thereafter, the starting compounds (E) and (F) can be present in small amounts in the optically clear compositions. As long as the reaction of the starting compounds (E) and (F) has not yet been concluded completely, alkanols having 1 to 4 carbon atoms and/or water are still formed.

One water molecule is formed in the condensation reaction between two silanol groups. One alkanol molecule is formed in the condensation reaction between one silanol group and one alkoxy group. In the condensation reaction between two alkoxy groups, one water molecule is required and two alkanol molecules are formed.

If the compounds (E) and (F) employed contain more alkoxy groups than silanol groups, water must be added. The amounts of water required are so low that, because of the solubilizing agent (C) employed, they are homogeneously miscible with the compounds (E) and (F). A maximum of 0.3, in particular 0.1, part by weight per 100 parts by weight of compounds (E) and (F) is sufficient.

The organopolysiloxanes (E2) and F2) preferably contain silanol groups, since the reaction between silanol groups and alkoxy groups proceeds rapidly.

The optically clear compositions can also be prepared by mixing (A) an organopolysiloxane which contains at least one monovalent SiC-bonded radical with primary, secondary and/or tertiary amino groups, and (B) 0.01 to 1 part by weight per 100 parts by weight of organopolysiloxane (A), comprising an alkanol having 1 to 4 carbon atoms and, optionally, water, with (C) 0.05 to 5 parts by weight of the solubilizing agent described above per 100 parts by weight of organopolysiloxane (A).

The cloudy mixtures of components (A) and (B) become clear again by this procedure.

The $C_1$- to $C_{19}$-carboxylic acid $C_1$- to $C_{12}$-alkyl esters and -glycol esters (C1) employed as the solubilizing agent (C) preferably have the formula $$R^7-\overset{O}{\underset{\|}{C}}-[O(CH_2)_k]_lOR^8 \tag{VIII}$$

in which $R^7$ is a $C_1$- to $C_{18}$-alkyl radical, $R^8$ is a hydrogen atom or a $C_1$- to $C_6$-alkyl radical, k has the values 1, 2 or 3 and l has the values 0 or 1 to 20.

$R^7$ is preferably straight-chain and has 1 to 19 carbon atoms. $R^8$ is preferably a straight-chain alkyl radical and has 1 to 6 carbon atoms. k preferably has the value 2. The value of l is preferably 0 or 1 to 5.

The $C_3$- to $C_{20}$-alkanols and $C_3$- to $C_{20}$-alkanol-$C_1$- to $C_{12}$-alkoxylates (C2) preferably have the formula $$R^7-CH_2CH_2-[O(CH_2)_k]_uOH \tag{IX}$$

u has the values 0 or 1 to 20 and k and $R^7$ have the above meanings.

$R^7$ preferably has 4 to 14 carbon atoms.

The organosilicon compounds (C3) containing glycoside radicals are preferably built up from units of the formula $$R^1_vR^9_oSiO_{\frac{4-v-o}{2}} \tag{X}$$

in which v has the values 0, 1, 2 or 3, o has the values 0, 1, 2 or 3 and $R^9$ is a radical of the formula $$Z-[(CH_2)_kO]_u-R^2- \tag{XI}$$

wherein

Z is a glycoside radical which is built up from 1 to 10, preferably 1 to 4, in particular 1 or 2, monosaccharide units and $R^1$, $R^2$, k and u have the above meanings, with the proviso that the sum of v and o is less than or equal to 3, and the organosilicon compound of units of formula (X) contains at least one radical $R^9$ per molecule.

Examples of monosaccharides from which the glycoside radicals Z can be built up are hexoses and pentoses, such as glucose, fructose, galactose, mannose, talose, allose, altrose, idose, arabinose, xylose, lyxose and ribose, glucose being more preferred.

Examples of alkylene radicals are methylene, ethylene, propylene, butylene, pentylene, hexylene, heptylene, octylene, nonylene, decylene and octadecylene radicals.

The radical $R^2$ is preferably linear alkylene radicals having 2 to 20 carbon atoms, more preferably linear alkylene radicals having 2 to 8 carbon atoms, in particular the n-propylene radical.

Examples of radicals $R^9$ are $G-CH_2CH_2CH_2-$, $G-(CH_2CH_2O)-CH_2CH_2CH_2-$, $G-(CH_2CH_2O)_2-CH_2CH_2CH_2-$, $$G-(CH_2\overset{CH_3}{\underset{|}{C}}HO)-CH_2CH_2CH_2-,$$

$$G-(CH_2\overset{CH_3}{\underset{|}{C}}HO)_2-CH_2CH_2CH_2-,$$

$$G-(CH_2CH_2O)-CH_2CH_2\overset{CH_3}{\underset{|}{C}}HCH_2-,$$

$$G-(CH_2CH_2O)_2-CH_2CH_2\overset{CH_3}{\underset{|}{C}}HCH_2-,$$

in which G is a glucoside radical ($C_6H_{11}O_6-$), $G_2-CH_2CH_2CH_2-$, $G_2-(CH_2CH_2O)-CH_2CH_2CH_2-$, $G_2-(CH_2CH_2O)_2-CH_2CH_2CH_2-$, $$G_2-(CH_2\overset{CH_3}{\underset{|}{C}}HO)-CH_2CH_2CH_2-,$$

$$G_2-(CH_2\overset{CH_3}{\underset{|}{C}}HO)_2-CH_2CH_2CH_2-,$$

$$G_2-(CH_2CH_2O)-CH_2CH_2\overset{CH_3}{\underset{|}{C}}HCH_2-,$$

and

-continued

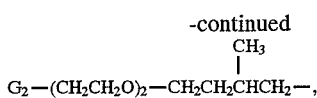

in which

G₂ is a glycoside radical built up from two glucose units.

The radical $R^9$ is preferably G—CH₂CH₂CH₂—,
G—(CH₂CH₂O)—CH₂CH₂CH₂—,
G₂—CH₂CH₂—CH₂—,
and
G₂—(CH₂CH₂O)—CH₂CH₂CH₂—,
where
G—(CH₂CH₂O)—CH₂CH₂CH₂—,
and
G₂—(CH₂CH₂O)—CH₂CH₂CH₂—, are more preferred and G is a glucoside radical (C₅H₁₁O₆—), and G₂ is a glucoside radical built up from two glucose units.

The organosilicon compounds containing glycoside radicals are preferably those of the formula

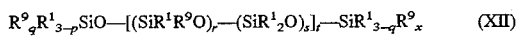

in which $R^1$ and $R^9$ have the above mentioned meaning, q is 0 or 1, r is 0 or a number from 1 to 200, preferably 0 or a number from 1 to 100, more preferably 0 or a number from 1 to 50, s is 0 or a number from 1 to 1000, preferably 0 or a number from 1 to 500, more preferably 0 or a number from 1 to 100 and t is 0 or a number from 1 to 1200, preferably 0 or a number from 1 to 600, more preferably 0 or a number from 1 to 100, with the proviso that the compound of formula (XII) contains at least one radical $R^9$.

If r in the organosilicon compounds containing glycoside radicals, of formula (XII), is on average other than 0, q is preferably 0.

If x in the organosilicon compounds containing glycoside radicals, of formula (XII), is on average other than 0, r is preferably 0.

Although not shown by formula (XII), up to 10 mole % of the diorganosiloxane units can be replaced by other siloxane units, such as $R^1SiO_{3/2}$, $R^6SiO_{3/2}$ and/or $SiO_{4/2}$ units, in which $R^1$ and $R^6$ have the above meaning.

The optically clear compositions can also comprise basic catalysts and acidic catalysts which promote the condensation and the equilibration reaction. Examples of basic and acidic catalysts are alkali metal hydroxides, in particular potassium hydroxide and cesium hydroxide, alkali metal alcoholates, quaternary ammonium hydroxides, such as tetramethylammonium hydroxide, benzyltrimethylammonium hydroxide and benzyltriethylammonium hydroxide, benzyltrimethylammonium butylate, β-hydroxyethyltrimethylammonium 2-ethylhexoate, quaternary phosphonium hydroxides, such as tetra-n-butylphosphonium hydroxide and tri-n-butyl-3-[tris-(trimethylsiloxy) silyl]-n-propylphosphonium hydroxide, alkali metal siloxanolates and ammonium organosiloxanolates, such as benzyltrimethylammonium methylsiloxanolate, hydrofluoric acid, boron fluoride and ammonium fluorides such as cetylamine hydrofluoride.

The basic catalysts and acidic catalysts which promote the condensation and the equilibration reaction can already be mixed with the compounds (E) and (F) during preparation of the optically clear compositions. Preferably, not more than 5, in particular not more than 2, parts by weight of basic or acidic catalysts are present per 100 parts by weight of organopolysiloxane (A) or compounds (E) and (F).

The optically clear compositions can comprise additives for particular purposes, for example for use as textile treatment compositions, in addition to the above constituents. Suitable additives are biocides, such as fungicides, bactericides, algicides and microbicides, thickeners, antifreezes, antistatics, dyestuffs, flameproofing agents and organic plasticizers.

In the following examples, unless stated otherwise in each case, a) all the amounts data are based on the weight;
b) all the pressures are 0.10 MPa (absolute);
c) all the temperatures are 20° C.

EXAMPLE 1

In each case 98 parts by weight of a polydimethylsiloxane oil with terminal hydroxyl groups and having a viscosity of 70 mPa. s at 25° C. were mixed with 2 parts by weight of a silane of the formula

and the mixture was stored at 20° C. After the time stated below, clouding occurred.

Silane 1: Y=—(CH₂)₃—NH(CH₂)₃CH₃; clouding after 17 days.

Silane 2: Y=—(CH₂)₃—NHCH₃; clouding after 10 days.

Silane 3: Y=—(CH₂)₃—NH—(CH₂)₃—OCH₃; clouding after 24 days.

Silane 4: Y=—(CH₂)₃—NH—(CH₂)₂—N(CH₃)₂; clouding after 20 days.

Silane 5: Y=—(CH₂)₃—NH(cyclohexyl); clouding after 20 days.

Silane 6: Y=—(CH₂)₃—NH—(CH₂)₂—NH₂; clouding after 21 days.

Two days after clouding had occurred, the mixtures were mixed with 1 part by weight of iso-tridecyl-diethylene glycol ether. The mixtures became optically clear after a few minutes.

EXAMPLE 2

The mixtures prepared in Example 1 were mixed with 10 parts by weight of iso-tridecanol 2 days after clouding had occurred. The mixtures became optically clear after a few minutes.

EXAMPLE 3

The mixtures prepared in Example 1 were mixed with 10 parts by weight of iso-propyl palmitate 2 days after clouding had occurred. The mixtures became optically clear after a few minutes.

EXAMPLE 4

The mixtures prepared in Example 1 were mixed with 10 parts by weight of ethylglycol acetate 2 days after clouding had occurred. The mixtures became optically clear after a few minutes.

EXAMPLE 5

In each case 98 parts by weight of a polydimethylsiloxane oil with terminal hydroxyl groups and having a viscosity of 70 mPa.s at 25° C. were mixed with 2 parts by weight of the silane 6 described in Example 1 and with the solubilizing agents stated in Examples 1 to 4 above, in the amounts stated, and the mixture was stored at 20° C. for 40 days. The mixtures remained optically clear.

What is claimed is:

1. An optically clear composition comprising
   (A) an organopolysiloxane which contains at least one monovalent SiC-bonded radical with primary, secondary and/or tertiary amino groups,
   (B) 0.01 to 1 part by weight per 100 parts by weight of organopolysiloxane (A) of compounds from a group consisting of water, methanol and ethanol and
   (C) 0.05 to 20 parts by weight of a solubilizing agent per 100 parts by weight of organopolysiloxane (A), chosen from a group consisting of
      (C1) $C_1$- to $C_{19}$-carboxylic acid $C_1$- to $C_{12}$-alkyl esters and -glycol esters,
      (C2) $C_3$- to $C_{20}$-alkanols and $C_3$- to $C_{20}$-alkanol-$C_1$- to $C_{12}$-alkoxylates and
      (C3) organosilicon compounds containing glycoside radicals.

2. An optically clear composition as claimed in claim 1, in which the organopolysiloxane (A) contains at least one siloxane unit of the formula

$$R^1_a Q_b SiO_{(4-a-b)/2} \qquad (I)$$

and all other siloxane units have the formula

$$R^1_c SiO_{(4-c)/2} \qquad (II)$$

in which
   $R^1$ is identical or different monovalent optionally fluorine-, chlorine- or bromine-substituted $C_1$- to $C_{18}$-hydrocarbon radicals, hydrogen atoms, $C_1$- to $C_{12}$-alkoxy or hydroxyl radicals or alkylglycol radicals,
   Q is a group of the formula

$$-R^2-[NR^3(CH_2)_m]_d N(R^3)_2 \qquad (III)$$

in which
   $R^2$ is a divalent $C_1$- to $C_{18}$-hydrocarbon radical,
   $R^3$ is a hydrogen atom or an optionally fluorine-, chlorine- or bromine- or $C_1$- to $C_5$-alkoxy-substituted $C_1$- to $C_{18}$-hydrocarbon radical,
   a has the values 0, 1, or 2,
   b has the values 1, 2 or 3,
   c has the values 0, 1, 2 or 3,
   d has the values 0, 1, 2, 3 or 4 and
   m has the values 2, 3, 4, 5 or 6 and the sum of a+b is not more than 4.

3. An optically clear composition as claimed in claim 1, wherein the amine content of organopolysiloxane (A) is from 0.01 to 2 meq/g, measured as the consumption of 1N hydrochloric acid in ml/g during titration to the neutral point.

4. A process for the preparation of an optically clear composition as claimed in claim 1, in which
   (E) compounds which are chosen from
      (E1) organosilanes which contain at least one monovalent SiC-bonded radical with primary, secondary and/or tertiary amino groups and at least one $C_1$- to $C_4$-alkoxy group and
      (E2) organopolysiloxanes which contain at least one monovalent SiC-bonded radical with primary, secondary and/or tertiary amino groups and at least one $C_1$- to $C_4$-alkoxy and/or silanol group and
   (F) compounds which are chosen from
      (F1) organosilanes which contain at least one $C_1$- to $C_4$-alkoxy group and
      (F2) organopolysiloxanes which contain at least one $C_1$- to $C_4$-alkoxy group and/or silanol group are reacted as starting compounds in the presence of
   (C) 0.01 to 20 parts by weight of the solubilizing agent per 100 parts by weight of the starting compounds (E) and (F).

5. A process for the preparation of an optically clear composition as claimed in claim 1, in which
   (A) an organopolysiloxane which contains at least one monovalent SiC-bonded radical with primary, secondary and/or tertiary amino groups and
   (B) 0.01 to 1 part by weight per 100 parts by weight of organopolysiloxane (A) consisting essentially of an alkanol having 1 to 4 carbon atoms and, optionally, water are mixed with
   (C) 0.05 to 5 parts by weight of the solubilizing agent per 100 parts by weight of organopolysiloxane (A).

6. An optically clear composition as claimed in claim 1, wherein the $C_1$- to $C_{19}$-carboxylic acid $C_1$- to $C_{12}$-alkyl ester or -glycol ester (C1) having the formula

$$R^7-\overset{O}{\underset{\|}{C}}-[O(CH_2)_k]_l OR^8 \qquad (VIII)$$

in which
   $R^7$ is a $C_1$- to $C_{18}$-alkyl radical,
   $R^8$ is a hydrogen atom or a $C_1$- to $C_6$-alkyl radical,
   k has the values 1, 2 or 3 and
   l has the values 0 or 1 to 20.

7. An optically clear composition as claimed in claim 1, wherein the $C_3$- to $C_{20}$-alkanol or $C_3$- to $C_{20}$-alkanol-$C_1$- to $C_2$-alkoxylate (C2) having the formula

$$R^7-CH_2CH_2-[O(CH_2)_k]_u OH \qquad (IX)$$

u has the values 0 or 1 to 20 and
k has the values 1, 2 or 3, and
$R^7$ is a $C_1$- to $C_{18}$-alkyl radical.

8. An optically clear composition as claimed in claim 1, wherein the organosilicon compound (C3) containing glycoside radicals is built up from units of the formula

$$R^1_v R^9_o SiO_{\frac{4-v-o}{2}} \qquad (X)$$

in which
   v has the values 0, 1, 2 or 3,
   o has the values 0, 1, 2 or 3 and
   $R^9$ is a radical of the formula

$$Z-[(CH_2)_k O]_u-R^2- \qquad (XI)$$

wherein
   Z is a glycoside radical which is built up from 1 to 10, monosaccharide units and
   $R^1$ is identical or different monovalent optionally fluorine-, chlorine- or bromine-substituted $C_1$- to $C_{18}$-hydrocarbon radicals, hydrogen atoms, $C_1$- to $C_{12}$-alkoxy or hydroxyl radicals or alkylglycol radicals,
   $R^2$ is a divalent $C_1$- to $C_{18}$-hydrocarbon radical, is a hydrogen atom
   k has the values 1, 2 or 3, and
   u has the values 0 or 1 to 20 and with the proviso that the sum of v and o is less than or equal to 3, and the organosilicon compound of units of formula (X) contains at least one radical $R^9$ per molecule.

* * * * *